United States Patent Office 3,631,166
Patented Dec. 28, 1971

3,631,166
NITROGEN CONTAINING STEROIDS
Milton Heller and Seymour Bernstein, New City, N.Y., assignors to American Cyanamid Company, Stamford, Conn.
No Drawing. Filed Mar. 16, 1970, Ser. No. 20,122
Int. Cl. C07c 173/10
U.S. Cl. 260—239.5          8 Claims

ABSTRACT OF THE DISCLOSURE

The preparation of androst-5-ene(16β,17β-b)azetidinium steroids and derivatives thereof from dimethylaminopregnenes is described. These steroids are useful as antibacterial agents and as tranquilizers.

DESCRIPTION OF THE INVENTION

This invention relates to new steroid compounds. More particularly, it relates to 16-nitrogen substituted androst-5-enes and 16-nitrogen substituted pregn-5-enes.

The novel steroids of this invention may be illustrated by the following formula:

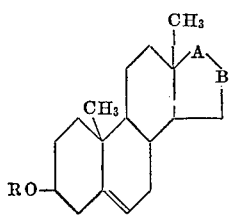

wherein R is hydrogen or trityl (triphenylmethyl) and A—B is

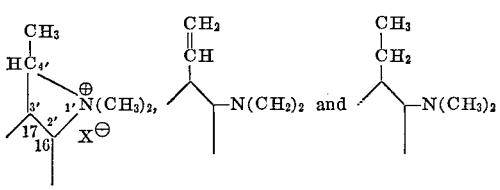

The steroids having the 16,20-ring structure are quaternary ammonium compounds in which X is a pharmaceutically acceptable anion. The anion may be, for example, bromide, chloride, p-toluenesulfonate, etc.

The present products are crystalline solids with relatively high melting points. They are insoluble in water and slightly soluble in methanol, acetone, etc.

The steroids of the present invention are prepared from 3',6'(R) - dimethyl - 2',3',4',5' - tetrahydro - 3β-hydroxy-androst-5-eno[16β,17β-d]-1',3'-oxazine described in U.S. Patent 3,409,611. The latter steroid is treated with trityl chloride in pyridine to form compound (I-B). Compound I-B is reduced with lithium aluminum hydride to afford compound (II). When compound (II) is treated with tosyl chloride (p-toluenesulfonyl chloride) in pyridine, the product obtained is compound (III-A) which on treatment with lithium bromide in methylene chloride-acetone, gives compound (III-B). Heating compound (III-A) in ethanolamine or with potassium hydroxide and dioxane produces (IV-A). Compound (IV-A) is de-tritylated to compound (IV-B) by warming in acetic acid. The mother liquor of the reaction (III-A) to (IV-A) contains compound (V-A) whose structure is proved by acetylation to (V-B), followed by removal of the trityl group from compound (V-B) by heating with acetic acid to give compound (V-C). Reduction of (III-A) with lithium aluminum hydride gives compound (VI) which can also be produced by the catalytic reduction of compound (IV-A). The various reactions described above are shown in the following Flowsheet:

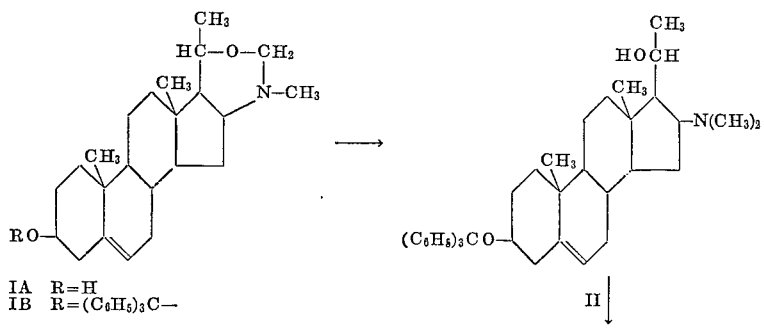

IA R=H
IB R=(C₆H₅)₃C—

II

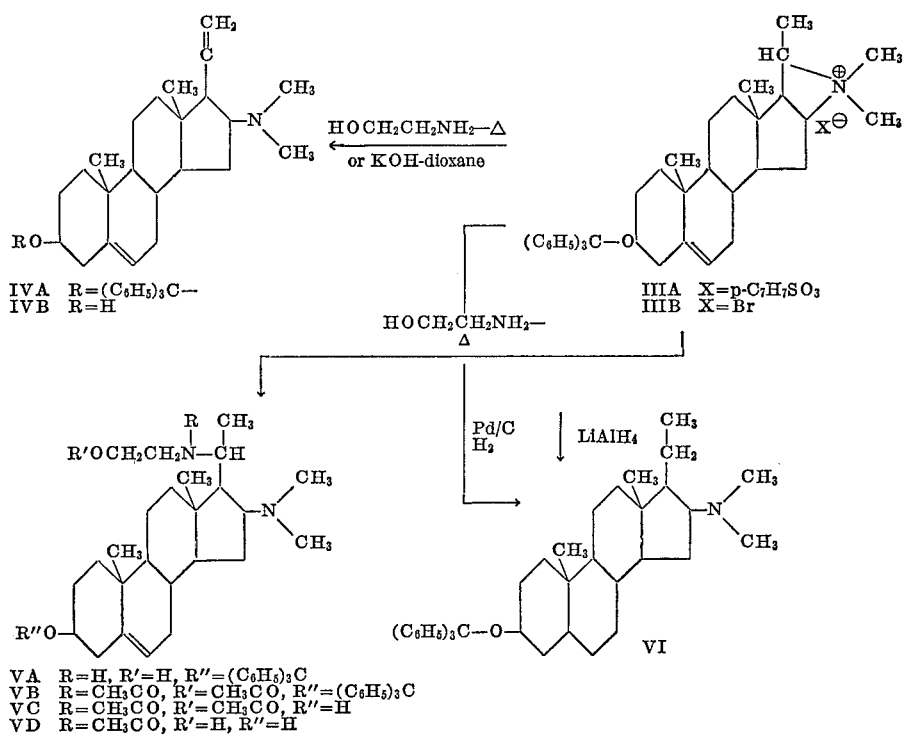

The present compounds are antibacterial agents being active against bacteria such as *Mycobacterium smegmatis, Staphylococus aureus,* strain Rose, and *Streptococus pyogenes* C203. The compounds also have central nervous system activity and are useful as tranquilizers.

The following examples describe in detail the preparation of represenative compounds of the invention.

EXAMPLE 1

Preparation of 3′,6′(R) - dimethyl - 2′,3′,4′,5′-tetrahydro-3β-trityloxyandrost-5-eno[16β,17β-d]-1′,3′-oxazine A mixture of 3′,6′(R)-dimethyl-2′,3′,4′,5′-tetrahydro-3β-hydroxyandrost-5-eno[16β,17β-d]-1′,3′-oxazine (I–A) (0.77 g.), trityl chloride (0.7 g.) and pyridine (10 moles) is refluxed for 6 hours, passed into ice-water and the resultant precipitate is collected. The solid is dissolved in methylene chloride and passed through a small pad of activated magnesium silicate. The solvent is removed under reduced pressure and the residue crystallized from methylene chloride-acetone to yield (I–B) (0.54 g.). An analytical sample has a melting point 257.5–258° C.

EXAMPLE 2

Preparation of 16β-dimethylamino-3β-trityloxypregn-5-en-20β-ol (II)

A mixture of the trityl ether (Example 1) (5.04 g.), lithium aluminum hydride (5 g.), and tetrahydrofuran (250 ml.) is stirred and refluxed 22 hours. The mixture is cooled in an ice bath and a saturated solution of potassium sodium tartrate added dropwise until the excess lithium aluminum hydride is consumed. The mixture is filtered, and the residue is stirred with additional hot tetrahydrofuran and filtered. The combined filtrates are taken to dryness under reduced pressure. Crystallization of the residue is methylene chloride-acetone gives the above product (3.29 g.), melting point 226.5–228° C. An additional 0.39 g. is collected from the mother liquor. The analytical sample has a melting point 227.5–229° C.

EXAMPLE 3

Preparation of 1′,1′,4′(S)-trimethyl-3β-trityloxyandrost-5-eno-[16β,17β-b]azetidinium tosylate (III–A)

A solution of the dimethylaminopregnene (Example 2) (0.177 g.) and p-toluenesulfonyl chloride (0.2 g.) in pyridine is allowed to stand at room temperature for 20 hours. The mixture is then poured into ice-water and extracted exhaustively with methylene chloride. The extract is dried (sodium sulfate) and the solvent removed under reduced pressure. Crystallization from methanol-acetone affords the above tosylate (0.04 g.) 245–246° C. (dec.).

EXAMPLE 4

Preparation of 1′,1′,4′(S)-trimethyl-3β-trityloxyandrost-5-eno-[16β,17β-b]azetidium bromide (III–B)

To a solution of the tosylate (Example 3) of (0.5 g.) in methylene chloride (100 ml.) is added a solution of lithium bromide (5 g.) in acetone (50 ml.). After standing 5 minutes at room temperature, the solution is concentrated under reduced pressure at room temperature to ca. 10 ml. Methylene chloride (150 ml.) is added and the resultant precipitate collected. The filtrate is taken to dryness under reduced pressure and the residue is crystallized from acetone to give the product above, melting point 175.5–176.5° C.

EXAMPLE 5

Preparation of 16β-dimethylaminopregna-5,20-dien-3β-yl trityl-ether (IV–A)

(A) A mixture of the tosylate (Example 3) (0.31 g.) and ethanolamine (12 ml.) is refluxed 4 hours, and then poured into ice-water. The resultant precipitate (0.24 g.) is collected and crystallized from acetone-methanol to give the above compound (0.088 g.), melting point 190–192° C. An analytical sample has a melting point 196.5–197.5° C.

(B) A mixture of the tosylate (Example 3) (0.95 g.), potassium hydroxide (5 g.) water (15 ml.) and dioxane (50 ml.) (2 phase system) is stirred and refluxed 19 hours. The mixture is poured into ice-water and the resultant precipitate (0.75 g.) collected, melting point 185°–190° C. A thin layer chromatograph shows essentially only the product of the example. This is crystallized to give 0.57 g. of product, melting point 198–200° C.

EXAMPLE 6

Preparation of 16-β-dimethylaminopregna-5,20-dien-3β-ol (IV–B)

A solution of the trityl ether (Example 5) to (0.64 g.) in acetic acid (50 ml.) is heated at 56° C. for 7.5 hours. Dilution of the solution with water precipitated triphenylcarbinol (0.28 g.) which is removed. The solution is made basic with 30% potassium hydroxide and the resultant precipitate collected. Crystallization from acetone gives the product of the example (0.198 g.), melting point 209.5–211.5° C. An analytical sample has a melting point 210–212° C.

EXAMPLE 7

Preparation of 16β-dimethylamino-20β-(N-2′-acetoxyethylacetamido)pregn-5-en-3β-ol (VC)

The mother liquor (ca. 3.25 g.) from the reaction of the tosylate (Example 3) (4.6 g.) and ethanolamine (150 ml.) in the preparation of (Example 5) by method A (1.45 g. of Example 5 product is recovered) is submitted to partition chromatography on diatomaceous earth with the system heptane:methyl Cellosolve. From the first half of a hold-back volume is isolated an additional 0.3 g. of (IV–A). An amorphous solid (1.45 g.) is isolated from the fourth hold back volume, but this could not be crystallized. Analysis by thin layer chromatography shows it is still a mixture. A repeated partition chromatography on diatomaceous earth as above again gives a non-crystallizable amorphous solid (V–A) (0.8 g.).

Compound (V–A) (0.8 g.) is acylated in the usual fashion with acetic anhydride (2 ml.) in pyridine (4 ml.) at room temperature. The mixture is poured into icewater and the resultant evaporation solid (V–B) (0.56 g.) is collected. This solid also can not be crystallized, but consists of essentially one component by thin layer chromatographic analysis.

Treatment of the acetate (V–B) (0.295 g.) in acetic acid (25 ml.) for 7.5 hours at 56° C., and then pouring the mixture into ice-water affords a precipitate, which is collected. This is triphenylcarbinol (0.05 g.). The filtrate is made alkaline with 30% potassium hydroxide. The resultant precipitate (0.156 g.) is collected and is placed on two preparative thin layer chromatography plates (200 x 200 x 1 mm.) and is developed in the system 85% of benzene:acetone:water (2:1:2) (upper phase) and 15% of methanol. The more polar band (0.127 g.) (ca. 9–9.5 cm. from the origin) is collected and crystallized from acetone-hexane to give (V–C) (0.030): melting point 203–203.5° C. (dec.).

The less polar band from the preparative plate (6.0 cm. from the origin) gives a crude compound (0.03 g.) which has physical measurement (mmr) suggesting (V–D) as its structure.

EXAMPLE 8

Preparation of 16β-dimethylaminopregn-5-ene-3β-yl trityl ether (VI)

(A) A mixture of the tosylate (Example 3) (0.5 g.) and lithium aluminum hydride (1.0 g.) in tetrahydrofuran (250 ml.) (the steroid is not in solution) is stirred at room temperature for 15 minutes, and then is stirred and refluxed for 5 hours. The resultant mixture is worked up as in the preparation of Example 2. Removal of the solvent under reduced pressure gives a glass, which is crystallized from acetone-methanol to give the compound of the example (0.26 g.) melting point 159–160° C. Recrystallization did not change the melting point.

(B) A mixture of the diene prepared in Example 5, (0.29 g.) and 10% palladium-on-charcoal (0.03 g.) in tetrahydrofuran (20 ml.) is stirred and treated with hydrogen at room temperature and pressure for 1 hour when approximately 1 mole equivalent of hydrogen is absorbed. After filtration of the catalyst, the tetrahydrofuran is removed from the filtrate under reduced pressure to give an amorphous solid. Crystallization from acetonemethanol gives the above compound (0.25 g.), melting point 160–161° C. The infrared spectrum is identical to that of the sample prepared in section A of this example.

We claim:
1. A steroid of the formula:

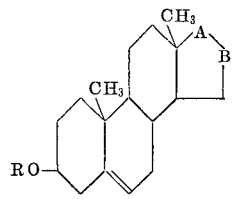

wherein R is hydrogen or trityl and A–B is

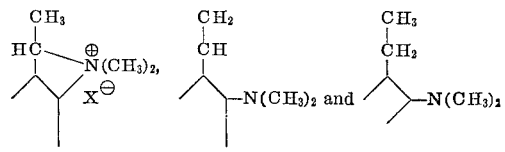

and X is a pharmaceutically acceptable anion.

2. The steroid in accordance with claim 1, 1′,1′-4′(S)-trimethyl-3β-trityloxyandrost - 5 - ene-[16β,17β-b]azetidinium tosylate.

3. The steroid in accordance with claim 1, 1′,1′,4′(S)-trimethyl-3β-trityloxyandrost - 5 - ene[16β,17β-b]azetidinium bromide.

4. The steroid in accordance with claim 1, 16β-dimethylaminopregna-5,20-dien-3β-yl trityl ether.

5. The steroid in accordance with claim 1, 16β-dimethylaminopregna-5,20-dien-3β-ol.

6. The steroid in accordance with claim 1, 16β-dimethylaminopregn-5-en-3β-yl trityl ether.

7. A method of preparing compounds of the formula:

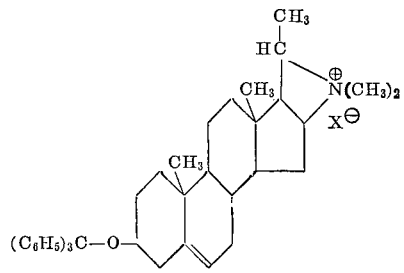

wherein X is p-toluenesulfonyl which comprises reacting 16β-dimethylamino-3β-trityloxypregn - 5 - en-20β-ol with p-toluenesulfonyl chloride in pyridine at ambient temperature.

8. A method according to claim 7 wherein the anion p-toluenesulfonyl is replaced by bromine on treatment with lithium bromide.

No references cited.

HENRY A. FRENCH, Primary Examiner

U.S. Cl. X.R.

260—397.5, 999